(12) United States Patent
Pramod et al.

(10) Patent No.: US 10,003,285 B2
(45) Date of Patent: Jun. 19, 2018

(54) DECOUPLING CURRENT CONTROL UTILIZING DIRECT PLANT MODIFICATION IN ELECTRIC POWER STEERING SYSTEM

(71) Applicant: STEERING SOLUTIONS IP HOLDING CORPORATION, Saginaw, MI (US)

(72) Inventors: Prerit Pramod, Saginaw, MI (US); Shrenik P. Shah, Saginaw, MI (US); Julie A. Kleinau, Bay City, MI (US); Michael K. Hales, Midland, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 100 days.

(21) Appl. No.: 14/503,841

(22) Filed: Oct. 1, 2014

(65) Prior Publication Data

US 2015/0372623 A1 Dec. 24, 2015

Related U.S. Application Data

(60) Provisional application No. 62/015,784, filed on Jun. 23, 2014.

(51) Int. Cl.
*H02P 6/21* (2016.01)
*H02P 3/14* (2006.01)
(Continued)

(52) U.S. Cl.
CPC .................. *H02P 6/08* (2013.01); *H02P 6/10* (2013.01); *H02P 21/0089* (2013.01);
(Continued)

(58) Field of Classification Search
CPC .............................. H02P 21/0035; H02P 6/002
See application file for complete search history.

(56) References Cited

U.S. PATENT DOCUMENTS 4,713,596 A 12/1987 Bose
4,733,149 A 3/1988 Culberson
(Continued)

FOREIGN PATENT DOCUMENTS

CN 1675099 A 9/2005
CN 1741368 A 3/2006
(Continued)

OTHER PUBLICATIONS

Chinese Office Action for Chinese Application No. 201210599015.5 dated Oct. 23, 2014; 29 pages.
(Continued)

*Primary Examiner* — Eduardo Colon Santana
*Assistant Examiner* — Charles S Laughlin
(74) *Attorney, Agent, or Firm* — Cantor Colburn LLP

(57) ABSTRACT

A method of controlling an electric motor that generates an output current from an input voltage command that includes a sum of a first voltage command and a second voltage command is provided. The method receives the output current from the motor as a feedback. The method determines a first set of gain factors to generate the first voltage command based on the feedback such that the input voltage command causes the motor to generate the output current with reduced influence of variations of a set of operating parameters of the motor. The method determines a difference between the feedback and a desired current. The method determines a second set of gain factors to generate the second voltage command based on the difference such that the input voltage command causes the motor to generate the output current as a first, second or higher order response.

17 Claims, 12 Drawing Sheets

(51) Int. Cl.
- *H02P 1/16* (2006.01)
- *H02P 6/08* (2016.01)
- *H02P 6/10* (2006.01)
- *H02P 21/10* (2016.01)
- *H02P 21/14* (2016.01)
- *H02P 21/00* (2016.01)
- *H02P 21/22* (2016.01)

(52) U.S. Cl.
CPC .............. *H02P 21/10* (2013.01); *H02P 21/14* (2013.01); *H02P 21/22* (2016.02)

(56) References Cited

U.S. PATENT DOCUMENTS

| | | | |
|---|---|---|---|
| 4,920,306 A * | 4/1990 | Mard | H02P 21/30 318/722 |
| 5,196,778 A | 3/1993 | Hayashida | |
| 5,223,775 A | 6/1993 | Mongeau | |
| 5,410,234 A | 4/1995 | Shibata et al. | |
| 5,652,495 A | 7/1997 | Narazaki et al. | |
| 5,927,430 A | 7/1999 | Mukai et al. | |
| 5,962,999 A | 10/1999 | Nakamura et al. | |
| 6,002,234 A | 12/1999 | Ohm et al. | |
| 6,021,251 A | 2/2000 | Hammer et al. | |
| 6,104,148 A | 8/2000 | Kumar et al. | |
| 6,152,254 A | 11/2000 | Phillips | |
| 6,161,068 A | 12/2000 | Kurishige et al. | |
| 6,222,334 B1 | 4/2001 | Tamagawa et al. | |
| 6,288,515 B1 | 9/2001 | Hiti et al. | |
| 6,370,459 B1 | 4/2002 | Phillips | |
| 6,465,975 B1 | 10/2002 | Naidu | |
| 6,499,559 B2 | 12/2002 | Mc Cann et al. | |
| 6,605,912 B1 | 8/2003 | Bharadwaj et al. | |
| 6,700,342 B2 | 3/2004 | Hampo et al. | |
| 6,900,607 B2 | 5/2005 | Kleinau et al. | |
| 7,034,493 B2 | 4/2006 | Yoshimoto et al. | |
| 7,071,649 B2 | 7/2006 | Kleinau et al. | |
| 7,145,310 B2 | 12/2006 | Ihm et al. | |
| 7,199,549 B2 | 4/2007 | Kleinau et al. | |
| 7,207,412 B2 | 4/2007 | Uryu | |
| 7,394,214 B2 | 7/2008 | Endo et al. | |
| 7,548,035 B2 | 6/2009 | Endo et al. | |
| 7,576,506 B2 | 9/2009 | Kleinau et al. | |
| 7,952,308 B2 | 5/2011 | Schulz et al. | |
| 8,633,766 B2 | 1/2014 | Khlat et al. | |
| 8,896,244 B2 | 11/2014 | Kleinau | |
| 8,952,637 B2 | 2/2015 | Suzuki | |
| 2002/0175649 A1 | 11/2002 | Reutlinger | |
| 2003/0076065 A1 | 4/2003 | Shafer et al. | |
| 2003/0146041 A1 | 8/2003 | Kanda | |
| 2004/0095089 A1 | 5/2004 | Collier-Hallman | |
| 2004/0195993 A1 | 10/2004 | Yoshimoto et al. | |
| 2005/0073280 A1 | 4/2005 | Yoshinaga et al. | |
| 2006/0000209 A1 | 1/2006 | Tsuda et al. | |
| 2006/0100766 A1 | 5/2006 | Schwarz et al. | |
| 2006/0122751 A1 | 6/2006 | Oyama et al. | |
| 2006/0145639 A1 | 7/2006 | Song et al. | |
| 2007/0043490 A1 | 2/2007 | Yokota et al. | |
| 2007/0046126 A1 | 3/2007 | Sagoo et al. | |
| 2007/0103105 A1 | 5/2007 | Endo et al. | |
| 2007/0132446 A1 | 6/2007 | Kleinau et al. | |
| 2007/0177314 A1 | 8/2007 | Weng et al. | |
| 2007/0278032 A1 | 12/2007 | Sakaguchi et al. | |
| 2008/0067960 A1 | 3/2008 | Maeda et al. | |
| 2008/0167779 A1 | 7/2008 | Suzuki | |
| 2008/0191656 A1 | 8/2008 | Satake et al. | |
| 2008/0265808 A1 | 10/2008 | Sparey et al. | |
| 2009/0026994 A1 | 1/2009 | Namuduri et al. | |
| 2009/0027000 A1 | 1/2009 | Gallegos-Lopez et al. | |
| 2009/0069979 A1 | 3/2009 | Yamashita et al. | |
| 2009/0114470 A1 | 5/2009 | Shimizu et al. | |
| 2009/0115362 A1 | 5/2009 | Saha et al. | |
| 2009/0189555 A1 | 7/2009 | Chen | |
| 2009/0224710 A1 * | 9/2009 | Mir | H02P 21/14 318/400.15 |
| 2009/0234538 A1 | 9/2009 | Ta et al. | |
| 2009/0267555 A1 | 10/2009 | Schulz et al. | |
| 2010/0140003 A1 | 6/2010 | Saha et al. | |
| 2010/0231148 A1 | 9/2010 | Tobari et al. | |
| 2011/0018281 A1 | 1/2011 | Tan et al. | |
| 2011/0127934 A1 | 6/2011 | Suzuki | |
| 2011/0153162 A1 | 6/2011 | Kezobo et al. | |
| 2011/0169432 A1 | 7/2011 | Dean | |
| 2011/0175556 A1 | 7/2011 | Tobari et al. | |
| 2011/0204833 A1 | 8/2011 | Santo et al. | |
| 2011/0231066 A1 * | 9/2011 | Ohno | B62D 5/046 701/42 |
| 2011/0297475 A1 | 12/2011 | Taniguchi et al. | |
| 2011/0309781 A1 | 12/2011 | Tomigashi | |
| 2012/0112549 A1 | 5/2012 | Perisic et al. | |
| 2012/0221208 A1 | 8/2012 | Kojo et al. | |
| 2012/0313701 A1 | 12/2012 | Khlat et al. | |
| 2013/0013154 A1 | 1/2013 | Aoki | |
| 2013/0154524 A1 | 6/2013 | Kleinau | |
| 2013/0187579 A1 | 7/2013 | Rozman et al. | |
| 2013/0261896 A1 | 10/2013 | Gebregergis et al. | |
| 2013/0285591 A1 * | 10/2013 | Suzuki | H02P 25/22 318/724 |
| 2014/0191699 A1 | 7/2014 | Dixon | |
| 2014/0239860 A1 | 8/2014 | Kleinau | |
| 2014/0265961 A1 | 9/2014 | Gebregergis et al. | |
| 2014/0265962 A1 | 9/2014 | Gebregergis et al. | |
| 2014/0285129 A1 | 9/2014 | Maeda | |
| 2014/0375239 A1 | 12/2014 | Kim et al. | |
| 2015/0069941 A1 | 3/2015 | Iwaji et al. | |
| 2015/0155811 A1 | 6/2015 | Merienne | |
| 2015/0194919 A1 | 7/2015 | Merienne et al. | |
| 2015/0222210 A1 | 8/2015 | Kleinau et al. | |
| 2016/0056745 A1 | 2/2016 | Ootake et al. | |

FOREIGN PATENT DOCUMENTS

| | | |
|---|---|---|
| CN | 101218146 A | 7/2008 |
| CN | 101399516 B | 4/2009 |
| CN | 101456429 A | 6/2009 |
| CN | 101615791 A | 12/2009 |
| CN | 101981804 A | 2/2011 |
| CN | 102570476 A | 7/2012 |
| CN | 102582679 A | 7/2012 |
| CN | 102751936 A | 10/2012 |
| EP | 1378419 A2 | 1/2004 |
| EP | 1768252 A1 | 1/2006 |
| EP | 1720242 A1 | 8/2006 |
| EP | 1720242 A1 | 11/2006 |
| EP | 1914878 A2 | 4/2008 |
| EP | 2003010 A2 | 12/2008 |
| EP | 2293428 A1 | 10/2009 |
| JP | 2000108916 A | 4/2000 |
| JP | 2001247049 A | 9/2001 |
| JP | 2003170850 A | 6/2003 |
| JP | 2007137272 A | 6/2007 |
| JP | 2008143200 A | 6/2008 |
| JP | 2012224258 A | 11/2012 |
| WO | 2014006329 A2 | 1/2014 |

OTHER PUBLICATIONS

Chinese Office Action for Chinese Patent Application No. 201310104183.7 dated Jan. 6, 2015.

F. Briz, M.W. Degner and R.D. Lorenz; "Analysis and Design of Current Regulators Using Complex Vectors", IEEE Industry Applications Society; Annual Meeting; New Orleans, Louisiana; Oct. 5-9, 1997; pp. 1504-1511.

European Search Report for EP App. No. 12196930.7, mailed from the European Patent Office dated Mar. 22, 2013.

Lennart Harnefors and Hans-Peter Nee; "Model-Based Current Control of AC Machines Using the Internal Model Control Method"; IEEE Transactions on Industry Applications; vol. 34, No. 1; Jan./Feb. 1998; pp. 133-141.

Kirtley, James; 6.061 Introduction to Electric Power Systems; Spring 2011; Massachussetts Institute of Technology.

(56) References Cited

OTHER PUBLICATIONS

English translation of office action issued in related CN Application No. 201400942309, dated Jan. 18, 2016, 14 pages.
European Search Report from related Application No. 15171189: dated Jan. 4, 2016; 9 pages.
Extended European search report for related European application No. 16153434.2, dated: Jul. 6, 2016, 8 pages.
Office Action dated Jan. 18, 2016.
Office Action dated Dec. 8, 2015.
Office Action issued in related CN Application No. 201400942309, dated Jan. 18, 2016, 34 pages.
Office Action dated Jul. 7, 2016.
EP Search Report for related EP Application No. EP12196930.7; dated Mar. 22, 2013; 7 pages.
Chinese Office Action for Chinese Patent Application No. 2014100892259, dated Jan. 13, 2017.
EP SR dated May 12, 2017.
Final OA dated Aug. 16, 2016.
Jeong et al., "Fault Detection and Fault-Tolerant Control of Interior Permanent-Magnet Motor Drive System for Electric Vehicle", IEEE Transactions on Industry Applications, vol. 41, No. 1, Jan./Feb. 2005, pp. 46-51.
NFOA, dated Feb. 17, 2016.
Non-Final Office Action dated Mar. 7, 2017.
Non-Final Office Action, dated Jan. 27, 2017.
Office Action dated Dec. 9, 2016.
Office Action dated Aug. 16, 2016.
European Patent Search; International Application No. EP14158556; International Filing Date: Jan. 8, 2017; dated Jul. 31, 2017; 9 pages.
European Patent Search; International Application No. EP14158559; International Filing Date: Jan. 8, 2017; dated Aug. 1, 2017; 7 pages.
Madani, et al; "Reduction of Torque Pulsations by Inductance Harmonics Identification of a Permanent-Magent Synchronous Machine"; IEEE Conference New York; Sep. 28, 1995; 6 pages.
Li Yituo et al., PMSM current harmonics suppression based on feedforward compensation, Journal of Tsinghua University (Science and Technology), Mar. 2012, vol. 52, No. 3, Beijing, China, English Abstract, 1 page.

\* cited by examiner

DECOUPLING CURRENT CONTROL UTILIZING DIRECT PLANT MODIFICATION IN ELECTRIC POWER STEERING SYSTEM

CROSS-REFERENCES TO RELATED APPLICATIONS

This patent application claims priority to U.S. Provisional Patent Application Ser. No. 62/015,784, filed Jun. 23, 2014. U.S. Provisional Patent Application Ser. No. 62/015,784 is incorporated herein by reference in its entirety.

BACKGROUND OF THE INVENTION

The output torque of a permanent magnet synchronous motor (PMSM) (either a surface permanent magnet (SPM) or an interior permanent magnet (IPM) motor) may be determined by a voltage command and a phase advance angle. A specific output torque of the PMSM is determined by first selecting a specific quadrature axis (also referred to as the q-axis) reference current and a direct axis (also referred to as the d-axis) reference current, and then determining the voltage command and the phase advance angle based on the selected quadrature axis reference current and the direct axis reference current.

Electric Power Steering (EPS) systems use an electric motor (e.g., PMSM) to provide steering assist. When using a PMSM, Field Oriented Control (FOC) is utilized, which allows an alternating current (AC) poly-phase (e.g., three-phase) motor voltage and current signals to be transformed into a synchronously rotating reference frame, commonly referred to as the d-axis/q-axis reference frame, where the motor voltages and currents become direct current (DC) quantities. The FOC torque control technique is implemented either using feedforward methods of control or a closed-loop current feedback control, or some combination of them.

Application of closed-loop current control of PMSM to EPS systems has unique and demanding requirements outside of the control system's capability to track the desired assist torque command (i.e., motor torque command). Many of these requirements are associated with a balance of the torque response behavior, motor input disturbance characteristics, current measurement noise transmission characteristics, and robustness to the accuracy of the estimated electric motor parameter estimates. Consistency of performance throughout the operating range of the control system is desired, including operation throughout the motor velocity range and operation near the supply voltage limit. Unlike high voltage power applications utilizing PMSMs, the supply voltage available for the control system from a vehicle is not unlimited, and the motor used in these applications is typically sized as efficiently as possible to deliver steady state power requirements. This requires the current control to operate in a stable and predictable manner as the transient voltage available to the control system becomes smaller near the peak power point of PMSM operation. Therefore, the control system should be configured to operate as desired while requiring relatively small motor voltage command transients.

SUMMARY OF THE INVENTION

In one embodiment of the invention, a system for controlling an electric motor that generates an output current from an input voltage command that includes a sum of a first voltage command and a second voltage command is provided. The system comprises a first module configured to receive the output current from the motor as a feedback, determine a first set of gain factors to generate the first voltage command based on the feedback such that the input voltage command causes the motor to generate the output current with reduced influence of variations of a set of operating parameters of the motor. The system further comprises a second module configured to receive a difference between the feedback and a commanded current and determine a second set of gain factors to generate the second voltage command based on the difference such that the input voltage command causes the motor to generate the output current as a first, second or higher order response.

In another embodiment of the invention, a method of controlling an electric motor that generates an output current from an input voltage command that includes a sum of a first voltage command and a second voltage command is provided. The method receives the output current from the motor as a feedback. The method determines a first set of gain factors to generate the first voltage command based on the feedback such that the input voltage command causes the motor to generate the output current with reduced influence of variations of a set of operating parameters of the motor. The method determines a difference between the feedback and a desired current. The method determines a second set of gain factors to generate the second voltage command based on the difference such that the input voltage command causes the motor to generate the output current as a first, second or higher order response.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
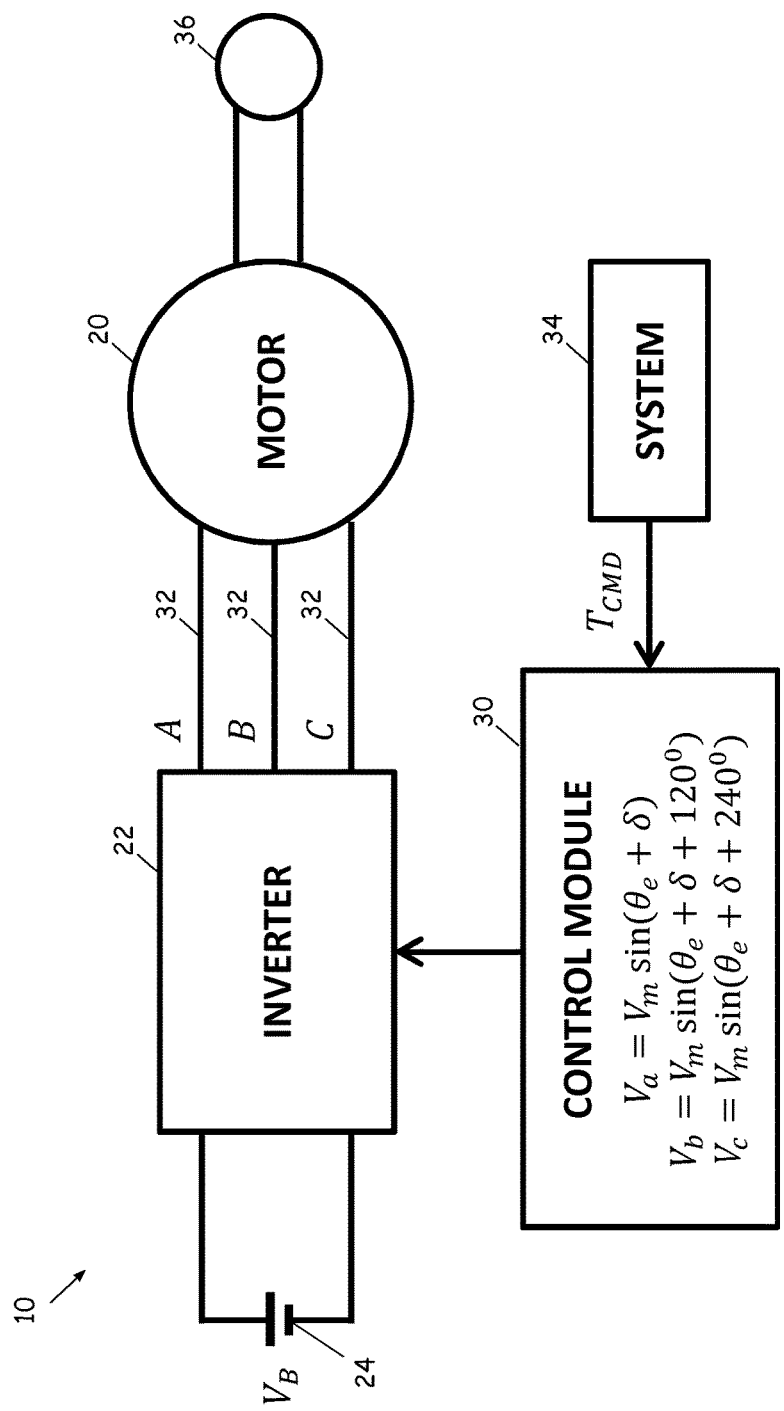
FIG. 1 is an exemplary schematic illustration of a motor control system in accordance with exemplary embodiments.

Referring now to the Figures, where the invention will be described with reference to specific embodiments, without limiting same, FIG. 1 illustrates a motor control system 10 in accordance with one aspect of the invention. In the exemplary embodiments as shown, the motor control system 10 includes a motor 20, an inverter 22, a supply voltage 24, and a control module 30 (also referred to as a controller). The voltage supply 24 supplies a supply voltage $V_B$ to the motor 20. In some embodiments, the voltage supply 24 is a 12 volt battery. However, it is to be understood that other types of voltage supplies may be used as well. The inverter 22 is connected to the motor 20 by a plurality of connections 32 (e.g., three connectors) that are labeled as 'A', 'B' and 'C'. In some embodiments, the motor 20 is a poly-phase, permanent magnet synchronous motor (PMSM). In this example, the motor 20 is a three-phase PMSM. The control module 30 is connected to the motor 20 through the inverter 22. The control module 30 receives a motor torque command $T_{CMD}$ from a system 34 such as, for example, a steering control system. The control module 30 includes control logic for sending a motor voltage command V to the motor 20 through the inverter 22.

Figure 2:
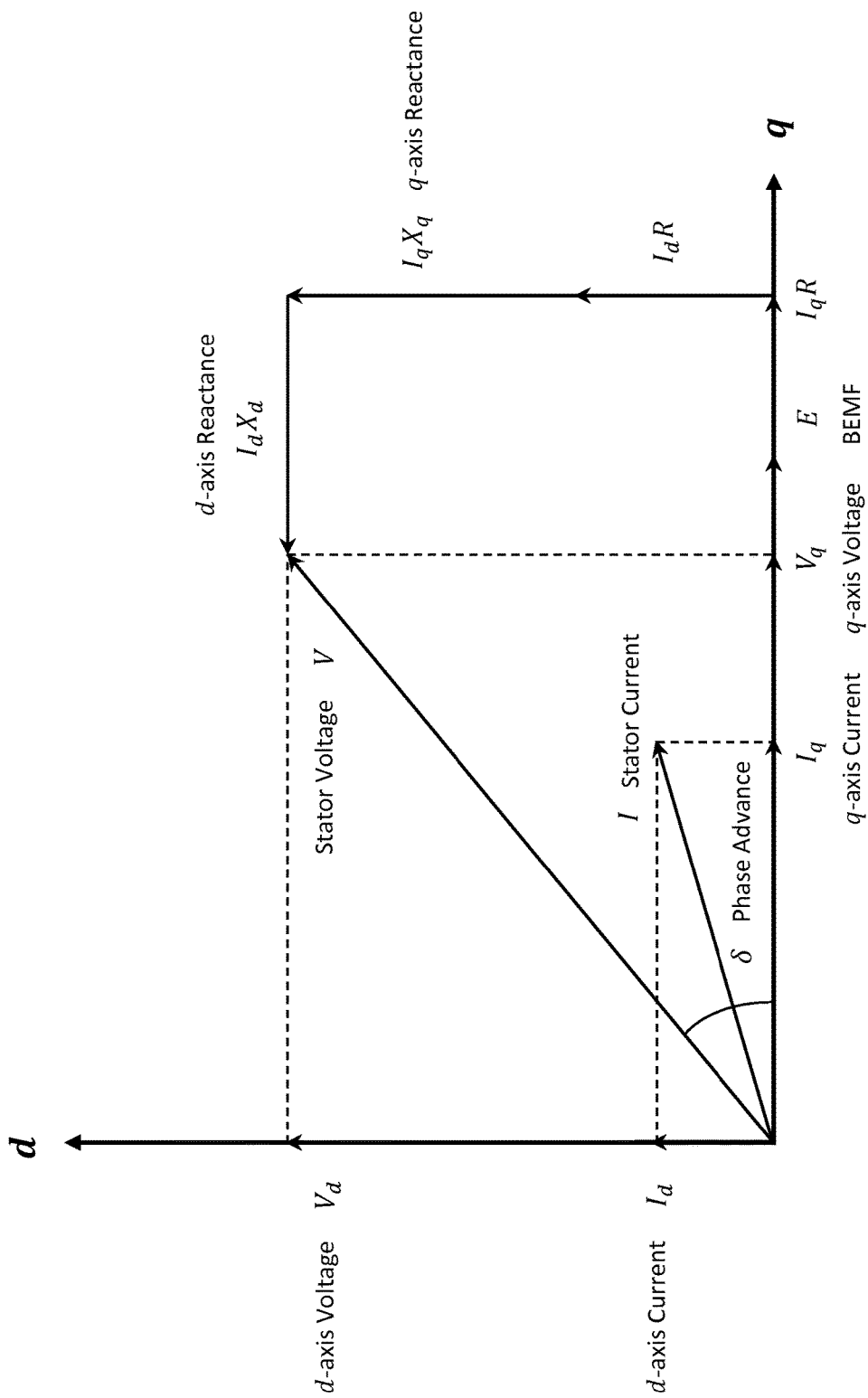
FIG. 2 is a phasor diagram of a motor in accordance with exemplary embodiments.

Referring now to FIGS. 1 and 2, the motor 20 is operated such that a phase of the motor voltage command V shifts with respect to a phase of a developed back electromotive force (BEMF) voltage E of the motor 20. A phasor diagram of the motor 20 is shown in FIG. 2 and illustrates a motor voltage command vector V having a magnitude that is $V_m$. A BEMF voltage vector E has a magnitude that is the BEMF voltage $E_g$. An angle between voltage vector V and the BEMF voltage vector E is defined and is referred to as a phase advance angle δ. A stator phase current is referred to as I, a stator phase current in the quadrature axis (q-axis) is referred to as $I_q$ a stator phase current in the direct axis (d-axis) is referred to as $I_d$, a stator phase reactance in the respective d-axis is referred to as $X_d$, the stator phase reactance in the q-axis is referred to as $X_q$, and a stator phase resistance in phase A is referred to as $R_a$.

In some embodiments, an encoder 36 (shown in FIG. 1) is used to measure an angular position θ of a rotor (i.e., mechanical position of the rotor) of the motor 20. The angular position θ of the motor 20 is converted to the electrical position $θ_e$ and is then used to determine the input phase voltages $V_a$, $V_b$ and $V_c$, where input phase voltage $V_a$ corresponds with connection A, input phase voltage $V_b$ corresponds with connection B, and input phase voltage $V_c$ corresponds with connection C. The control module 30 includes control logic for calculating input phase voltages $V_a$, $V_b$, and $V_c$ by the following equations:

$V_a = V_m \sin(θ_e + δ)$  (Equation 1)

$V_b = V_m \sin(θ_e + δ + 120°)$  (Equation 2)

$V_c = V_m \sin(θ_e + δ + 240°)$  (Equation 3)

where $θ_e$ in the equations 1-3 is the electrical position of the rotor that is converted from the mechanical angle or position θ of the rotor. The motor 20 rotates in a clockwise as well as a counterclockwise direction, and may also produce torque in both the clockwise and counterclockwise direction during operation.

Figure 3:
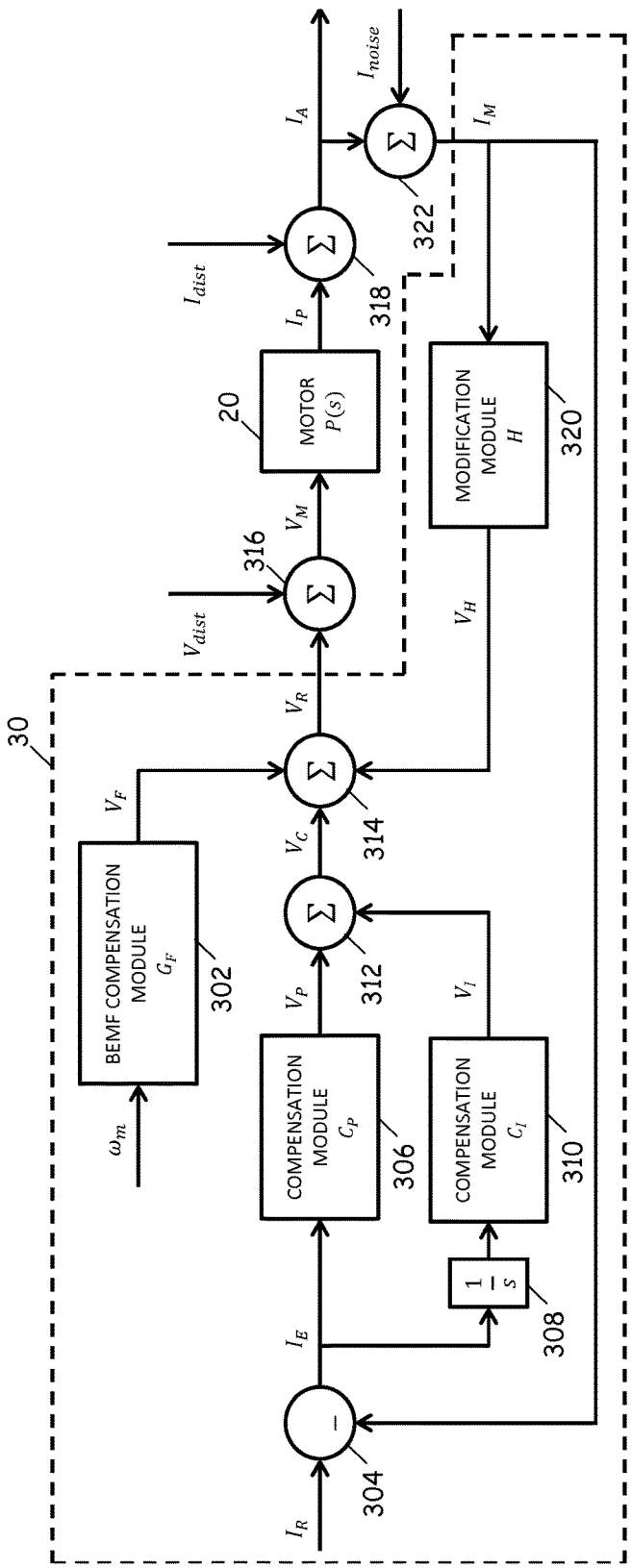
FIG. 3 is an exemplary block diagram of the control module in accordance with exemplary embodiments.

FIG. 3 is an exemplary block diagram of the control module 30 in accordance with some embodiments of the invention. As shown, the control module 30 includes several sub-modules—a BEMF compensation module 302, an integration module 308, compensation modules 306 and 310, a modification module 320, a subtraction module 304, and addition modules 312-316. FIG. 3 also illustrates the motor 20. The inverter 22 between the control module 30 and the motor 20 is not depicted in FIG. 3 for the simplicity of illustration and description.

The motor 20 is a plant that is being controlled by the control module 30. That is, the motor 20 receives a voltage command $V_R$ and generates torque (i.e., draws or outputs the current $I_P$, which is the actual motor current as described above by reference to FIGS. 1 and 2). The motor 20 together with the control module 30 makes up a closed-loop system that has a certain frequency response characteristic. As can be appreciated, the frequency response of the closed-loop system is governed by a set of model equations that defines a transfer function that transforms the input current command $I_R$ to the output current $I_P$. In other words, the control module 30 regulates the output current $I_P$ by sending the voltage commend $V_M$ generated based on the input current command $I_R$.

In some embodiments, the control module 30 is a feedback controller having closed-loops. That is, the output current of the motor 20 is fed back to the control module 30 and the control module 30 uses the feedback to regulate the output of the motor 20. As the output current $I_P$ is fed back to the control module 30, a disturbance current $I_{dist}$ and a noise current $I_{noise}$ are added to $I_P$ and what comes back to the control module 30 is a feedback current $I_M$, which is the output of a current sensor (not shown). That is, $I_M$ is the current measured and fed back to the control module 30, and is equal to the sum of $I_P$, $I_{dist}$ and $I_{noise}$.

The modification module 320 takes as input from the motor 20 the measured feedback current $I_M$. Based on the measured feedback current $I_M$, the modification module 320 decouples the d-axis component $I_d$ of the output current $I_P$ from the variations of the q-axis current component $I_q$. That is, the modification module 320 eliminates the influence of the variations of the q-axis current $I_q$ on the d-axis component of the output current. The modification module 320 also decouples the q-axis component $I_q$ of the output current $I_P$ from the variations of d-axis current $I_d$ similarly. The modification module 320 achieves such decoupling by generating a modification voltage $V_H$ using a matrix H as will be described further below. The voltage command $V_M$, which includes the modification voltage $V_H$, causes the motor 30 to draw each component of the current $I_P$ without being affected by the variations of the other current component.

In addition, the modification module 320 of some embodiments makes the closed-loop system more robust to the stator resistance variations of the motor 20 as well as the measurement inaccuracies of the resistances. The modification voltage $V_H$ is combined by the adder 314 with a voltage command $V_C$ coming from the compensation modules 306 and 310 to produce a voltage command $V_R$ that causes the motor 30 to draw current in a stable manner that is not affected by the resistance of the motor 20 or any inaccurate estimation of the resistance. The addition module 316 combines the voltage command $V_R$ and a disturbance voltage $V_{dist}$ to produce the voltage command $V_M$ supplied to the motor 20.

The compensation modules 306 and 310 make up a matrix-valued (or, multi-dimensional) proportional-integral (PI) controller that compensates for a difference $I_E$ between a commanded current $I_R$ and the measured current $I_M$ to control the motor 20. The compensation module 306 produces a proportional voltage command $V_P$ from a difference current $I_E$ (determined by the subtraction module 304). The compensation module 306 along with the integration module 308 produces an integral voltage command $V_I$. The addition module 312 combines the voltage commands $V_P$ and $V_I$ to produce a voltage command $V_C$. The proportional voltage command $V_P$ and the integral voltage command $V_I$ are determined in such a way that the combined voltage command $V_C$, when applied to the motor 20, causes the overall current to current transfer function to be of a specific, desired order. It is to be noted that each of $I_R$, $I_M$, $I_E$, $V_P$, $V_I$, and $V_C$ has a d-axis component and a q-axis component. Also, $I_R$, $I_M$, $I_E$, $V_P$, $V_I$, and $V_C$ represent vectors and not scalar values.

The compensation module 306 is a proportional controller and the compensation module 310 is an integral controller. The proportional compensation module $C_P$ aids in configuring the frequency response of the closed-loop system when the first order type response is desired, in addition to providing beneficial tradeoffs between the motor input disturbance transfer function behavior and the current measurement noise transfer function behavior. When a higher order transfer function (e.g., a third order) is desired, a different configuration than the PI controller is utilized. More details about configuring the closed-loop system to have a frequency response of a specific, desired order will be described further below by reference to FIGS. 4-9.

The BEMF compensation module 302 is configured to compensate for dynamics (e.g., variations) of BEMF voltage that are slower than the dynamics of the currents of the motor 20. Specifically, the BEMF compensation module 302 takes as input the rotor mechanical velocity $\omega_m$ and outputs voltage $V_F$ that compensates for the dynamics of the BEMF voltage.

As used herein, the term "module" or "sub-module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module or a sub-module can be embodied in memory as a non-transitory machine-readable storage medium readable by a processing circuit and storing instructions for execution by the processing circuit for performing a method. Moreover, the modules and sub-modules shown in FIG. 3 may be combined and/or further partitioned.

Figure 4:
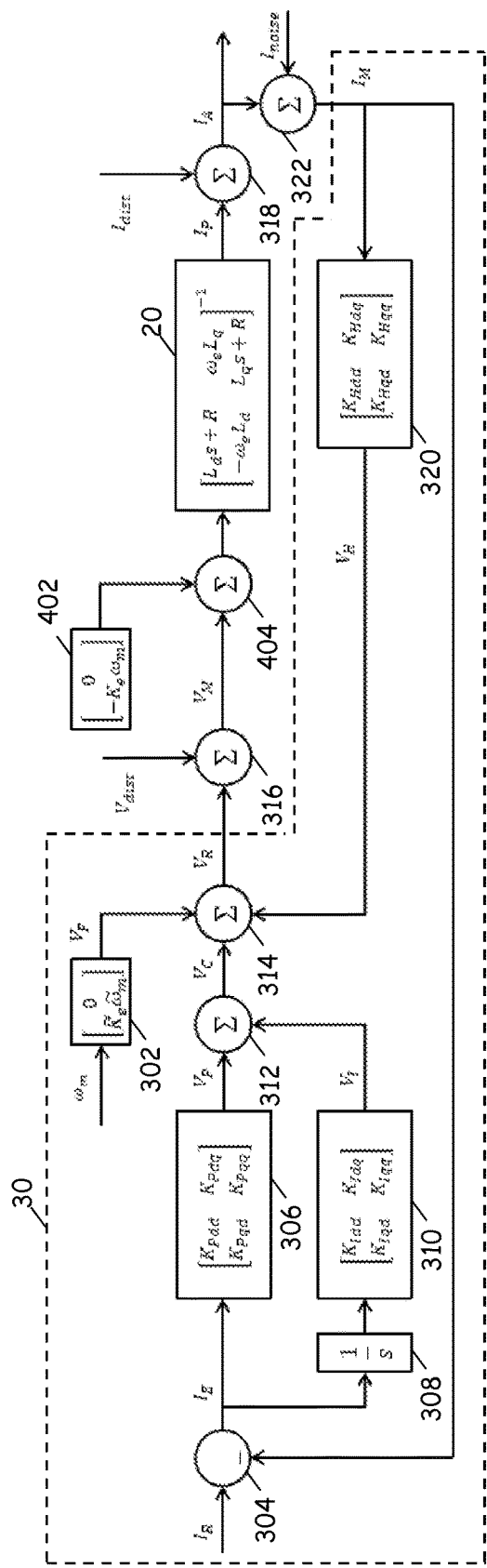
FIG. 4 is an exemplary block diagram of the control module in accordance with exemplary embodiments.

FIG. 4 illustrates a block diagram of the control module 30 in accordance with some embodiments of the invention. In particular, the modules are illustrated to include transfer matrices. It is to be noted that the modules are illustrated to include these matrices in order to facilitate ease of understanding what the modules are configured to do.

In some embodiments, the control module 30 is configured to generate a voltage command $V_R$ using a motor control model for line-to-neutral voltage equations:

$$V_d = L_d \frac{dI_d}{dt} + RI_d + \frac{N_p}{2}\omega_m L_q I_q \quad \text{(Equation 4)}$$

$$V_q = L_q \frac{dI_q}{dt} + RI_q - \frac{N_p}{2}\omega_m L_d I_d + K_e \omega_m \quad \text{(Equation 5)}$$

$$T_e = \frac{3}{2}K_e I_q + \frac{3}{4}N_p(L_q - L_d)I_d I_q \quad \text{(Equation 6)}$$

where $V_d$ and $V_q$ are the d-axis and q-axis motor voltages (in Volts), respectively; $I_d$ and $I_q$ are the d-axis and q-axis motor currents (in Amperes), respectively; $L_d$ and $L_q$ are the d-axis and q-axis motor inductances (in Henries), respectively; R is the motor circuit (i.e., the motor and controller) resistance (in Ohms), $K_e$ is the motor BEMF coefficient (in Volts/rad/s); $\omega_m$ is the mechanical motor velocity in (in rad/s); $N_p$ is the number of poles of the motor 20; and $T_e$ is the electromagnetic motor torque (in Nm).

It is to be noted that equation 6 for computing the electromagnetic motor torque $T_e$ is nonlinear and that equation 6 represents a sum of the torque developed by leveraging the magnetic field from the permanent magnets and the reluctance torque generated by the rotor saliency (i.e., a difference between $L_q$ and $L_d$) and desired values for $I_d$ and $I_q$. A reference model design for optimizing selection of the reference currents $I_d$ and $I_q$ to use for PMSM control is described in U.S. Patent Application, entitled "Generation of a Current Reference to Control a Brushless Motor," filed Nov. 26, 2013, with an 14/090,484," which is incorporated herein by reference in its entirety.

The parameters in equations 4-6 vary significantly during normal operation of the motor 20—potentially over 100% variation in R, and 5-20% variation in inductances $L_d$ and $L_q$ and 15-20% in $K_e$. R varies with the build and the temperature of the motor 20. $L_d$ and $L_q$ vary due to saturation (i.e., as a function of $I_d$ and $I_q$) and $K_e$ varies due to saturation (as a function of $I_q$) and with the temperature.

In the equations 4 and 5, $$\frac{N_p}{2}\omega_m$$

is me electrical motor velocity $\omega_e$ of the motor 20. The electrical motor velocity is assumed to be a slowly varying parameter. In addition, due to relatively slow flux dynamics, the quasi-static back-EMF (BEMF) term $K_e\omega_m$ (i.e., the disturbance from the motor) may be considered a constant. This disturbance from 402 is compensated by a compensation module 302 in the feedforward path. That is, the addition module 404 combines the voltage command $V_M$, which includes this compensation from the compensation module 302, with the disturbance from 402. These two assumptions allow linearization of equations 4 and 5 for a fixed velocity of the motor 20. From FIG. 5 and on, the disturbances $V_{dist}$, $I_{dist}$ and $I_{noise}$ are not illustrated for the simplicity of illustration and description. Accordingly, the equations 4 and 5 may be re-written as the following linear equations 7 and 8, respectively:

$$V_d = L_d \dot{I}_d + RI_d + \omega_e L_q I_q \quad \text{(Equation 7)}$$

$$V_q{}^1 = V_q - K_e\omega_m = L_q\dot{I}_q + RI_q - \omega_e L_d I_d \quad \text{(Equation 8)}$$

Further, equations 7 and 8 can be compactly written using s-domain representation as follows:

$$U = P_i(s)X \quad \text{(Equation 9)}$$

$$\begin{bmatrix} V_d \\ V_q' \end{bmatrix} = \begin{bmatrix} L_d s + R & \omega_e L_q \\ -\omega_e L_d & L_q s + R \end{bmatrix} \begin{bmatrix} I_d \\ I_q \end{bmatrix} \quad \text{(Equation 10)}$$

where U is the matrix $$\begin{bmatrix} V_d \\ V_q' \end{bmatrix};$$

$P_i(s)$ is the matrix $$\begin{bmatrix} L_d s + R & \omega_e L_q \\ -\omega_e L_d & L_q s + R \end{bmatrix};$$

and X is the matrix $$\begin{bmatrix} I_d \\ I_q \end{bmatrix}.$$

For the simplicity of illustration and description, $V_q^I$ is illustrated and described as $V_q$ hereinafter. In equation 10, the output current matrix X of the motor 20 is translated into the input voltage matrix U via the complex frequency transfer matrix $P_i(s)$. This complex frequency transfer matrix $P_i(s)$ is the inverse of the true transfer matrix P(s). This $P_i(s)$ is shown to be included in the motor 20 in FIG. 4. $P_i(s)$ can also be denoted as $P^{-1}(s)$ to indicate that $P_i(s)$ is the inverse of P(s). It is to be noted that P(s), which is an inverse of $P_i(s)$, is shown to be included in the motor 20 to line up the elements the matrix included in the modification module 320 with the elements of $P_i(s)$.

The actual plant transfer matrix P(s), which converts the input voltage to the output current may be written as:

$$X = P(s)U \quad \text{(Equation 11)}$$

$$\begin{bmatrix} I_d \\ I_q \end{bmatrix} = \frac{1}{L_d L_q s^2 + R(L_d + L_q)s + R^2 + \omega_e^2 L_d L_q} \begin{bmatrix} L_q s + R & -\omega_e L_q \\ \omega_e L_d & L_d s + R \end{bmatrix} \begin{bmatrix} V_d \\ V_q \end{bmatrix} \quad \text{(Equation 12)}$$

where P(s) is $$\frac{1}{L_d L_q s^2 + R(L_d + L_q)s + R^2 + \omega_e^2 L_d L_q} \begin{bmatrix} L_q s + R & -\omega_e L_q \\ \omega_e L_d & L_d s + R \end{bmatrix}.$$

Using the transfer matrix H, shown as $$\begin{bmatrix} K_{Hdd} & K_{Hdq} \\ K_{Hqd} & K_{Hqq} \end{bmatrix}$$

in FIG. 4, the modification module 320 modifies $P_i(s)$ or P(s) to get effective transfer matrix $P_{eff}(s)$. In some embodiments, the effective transfer matrix $P_{eff}(s)$ is defined as:

$$P_{eff} = (P_i(s) - H)^{-1} \quad \text{(Equation 13)}$$

That is, $P_{eff}(s)$ may be defined as the inverse of $P_i(s)$–H. Then, the effective inverse transfer matrix $P_{ieff}(s)$ is $P_i(s)$–H, which can be written in a matrix form:

$$P_{ieff}(s) = \begin{bmatrix} L_d s + R - K_{Hdd} & \omega_e L_q - K_{Hdq} \\ -\omega_e L_d - K_{Hqd} & L_q s + R - K_{Hqq} \end{bmatrix} \quad \text{(Equation 14)}$$

By implementing the matrix H, the modification module 320 may decouple the coupling terms in equations 7 and 8 (or the corresponding elements in the matrix $P_i(s)$ or P(s)). By configuring H to have appropriate elements (i.e., gain factors), the modification module 320 allows for changes in $V_g$ to control $I_q$ without affecting $I_d$, and allows for changes in $V_d$ to control $I_d$ without affecting $I_q$. Specifically, the off-diagonal elements of H are selected to cancel the off-diagonal elements of $P_i(s)$, which correspond to the coupling terms of the equations 7 and 8. The off-diagonal elements of H may be expressed as follows:

$$K_{Hdq} = \tilde{\omega}_e \tilde{L}_q \quad \text{(Equation 15)}$$

$$K_{Hqd} = -\tilde{\omega}_e \tilde{L}_d \quad \text{(Equation 16)}$$

where $\tilde{\omega}_e$ is an estimated electrical motor velocity of the motor 20; $\tilde{L}_q$ is an estimated q-axis inductance of the motor 20; and $\tilde{L}_d$ is an estimated d-axis inductance of the motor 20.

The modification module 320 may also desensitize the motor 20 from the variations of motor operation parameters (i.e., reduces influence of the variations), especially from the variations in the motor resistance, so that the current that the motor 20 draws is also desensitized from the variations. As can be appreciated, the diagonal elements R–$K_{Hdd}$ and R–$K_{Hqq}$ of the $P_{ieff}(s)$ should be greater than zero (i.e., a positive resistance value) in order to maintain the motor's stability in the presence of variations in resistance. In some embodiments, the diagonal elements of the matrix H, namely $K_{Hdd}$ and $K_{Hqq}$, are configured to have negative values so as to ensure the diagonal elements R–$K_{Hdd}$ and R–$K_{Hqq}$ of the $P_{ieff}(s)$ are positive. The diagonal elements of H may be expressed as follows:

$$K_{Hdd} = -R_d \quad \text{(Equation 17)}$$

$$K_{Hqq} = -R_q \quad \text{(Equation 18)}$$

where $R_d$ and $R_q$ are resistance values (in Ohms). $R_d$ and $R_q$ values are selected and specifically configured to balance the control system sensitivity to motor parameter variations (specifically, the variations in resistance, which typically swings as large as 100% over temperature), voltage disturbance rejection transfer function properties, and current measurement noise sensitivity properties, and robustness to imperfect decoupling of the two current loops. Moreover, because of the $R_d$ and $R_q$, the effective time-constant of the motor 20 gets shortened or reduced (i.e., a faster response time results). Accordingly, the matrix H may be written as:

$$H = \begin{bmatrix} -R_d & \tilde{\omega}_e \tilde{L}_q \\ -\tilde{\omega}_e \tilde{L}_d & -R_q \end{bmatrix} \quad \text{(Equation 19)}$$

It is to be noted that these elements of the matrix H are scheduled in terms of motor parameters, which are nonlinear and continuously changing with the motor's operating conditions (e.g., temperature, saturation, etc.)

With these elements in the matrix H and with the assumption that $\tilde{\omega}_e$, $\tilde{L}_d$ and $\tilde{L}_q$ are accurate estimations, the effective motor transfer matrix $P_{\mathit{eff}}$ may, in this embodiment, be defined as:

$$P_{\mathit{eff}} = \begin{bmatrix} \dfrac{1}{L_d s + R + R_d} & 0 \\ 0 & \dfrac{1}{L_q s + R + R_q} \end{bmatrix} \quad \text{(Equation 20)}$$

As shown in the effective motor transfer matrix $P_{\mathit{eff}}$, the motor 20 is decoupled in both the d-axis and q-axis and a configurable effective resistance element is available to further adjust the dynamic response of the motor 20.

Figure 5:
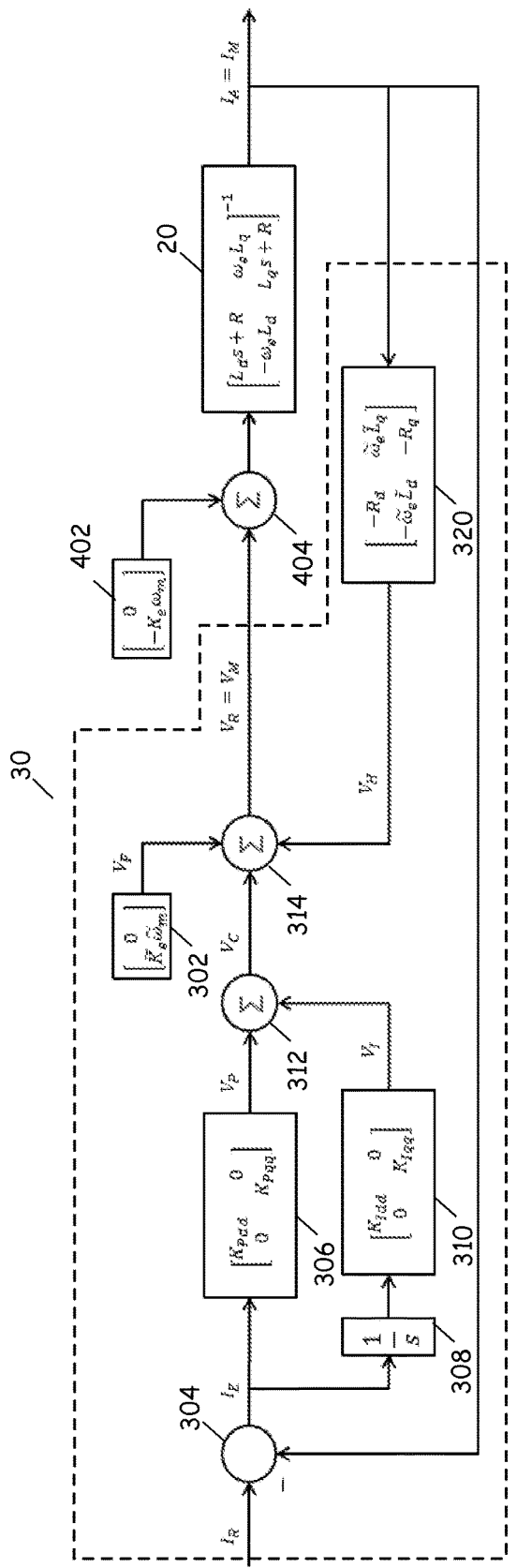
FIG. 5 is an exemplary block diagram of the control module in accordance with exemplary embodiments.

With the modification module 320 decoupling the coupled elements of the transfer matrix P(s) of the motor 20 and desensitizing the motor 20 from the resistance variation, the proportional compensation module 306 and the integral compensation module 310 may be configured and optimized to cause the closed-loop system to produce specific transfer function behavior. In some embodiments, the compensation modules implement matrices $C_P$ and $C_I$, respectively, in which coupling elements are omitted. That is, only diagonal elements of the matrices $C_P$ and $C_I$ are used and the off-diagonal elements (i.e., the coupling elements) of the matrices $C_P$ and $C_I$ are set to zero. When the target transfer function response of the closed-loop system is a first order response, the overall block diagram of the configuration of the control module 30 is shown in FIG. 5. As shown in FIG. 5, $C_P$ and $C_I$ are defined as:

$$C_P = \begin{bmatrix} K_{Pdd} & 0 \\ 0 & K_{Pqq} \end{bmatrix} \quad \text{(Equation 21)}$$

$$C_I = \begin{bmatrix} K_{Idd} & 0 \\ 0 & K_{Iqq} \end{bmatrix} \quad \text{(Equation 22)}$$

Figure 6:
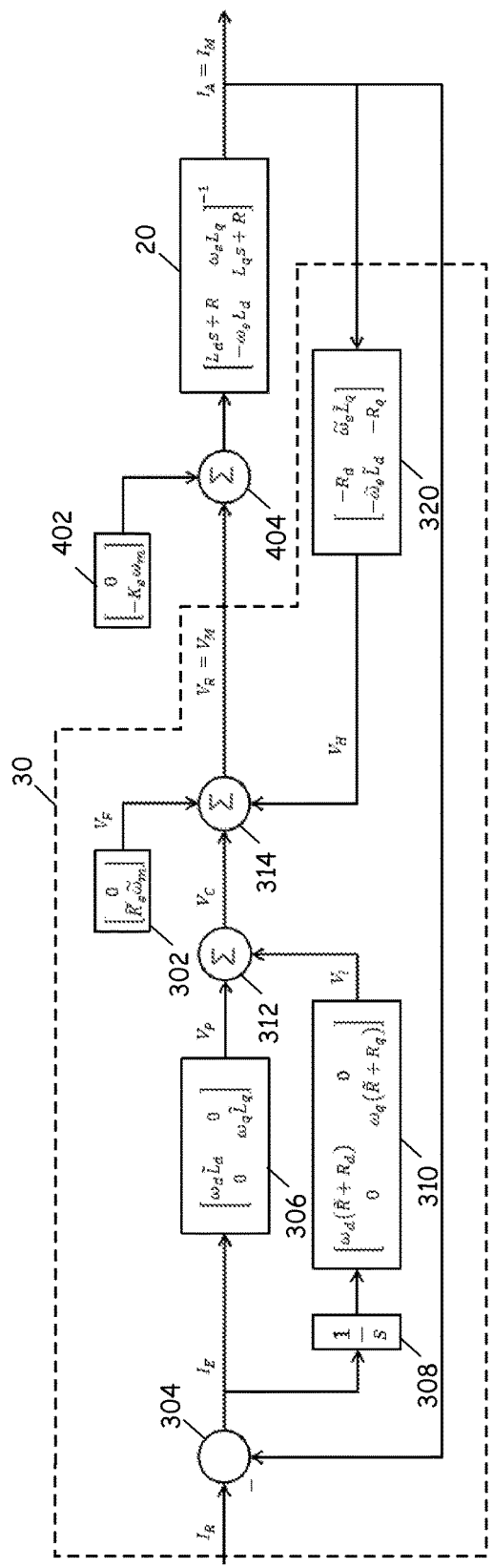
FIG. 6 is an exemplary block diagram of the control module in accordance with exemplary embodiments.

To achieve an overall current to current transfer function behavior, which mimics a first order transfer function in both the d-axis and q-axis control loops (i.e., the loop-forming feedback signal path of the compensation module 306 or 310 and the motor 20 includes d-axis control loop and q-axis control loop), the elements (i.e., gain factors) of the matrices $C_P$ and $C_I$ are selected as follows:

$$K_{Pdd} = \omega_d \tilde{L}_d \quad \text{(Equation 23)}$$

$$K_{Idd} = \omega_d (\tilde{R} + R_d) \quad \text{(Equation 24)}$$

$$K_{Pqq} = \omega_q \tilde{L}_q \quad \text{(Equation 25)}$$

$$K_{Iqq} = \omega_q (\tilde{R} + R_q) \quad \text{(Equation 26)}$$

where that $\omega_d$ and $\omega_g$ in the equations 21-24 represent the desired closed-loop cutoff frequencies in the d-axis and q-axis control loops; $\tilde{R}$, $\tilde{L}_d$ and $\tilde{L}_q$ represent the estimated resistance, the estimated d-axis inductance, and the estimated q-axis inductance, respectively; and $R_d$ and $R_q$ represent the additional "effective" resistances in the d-axis and q-axis control loops, which are also the values of the diagonal elements of the matrix H. The overall block diagram for the configuration with these elements of the matrices $C_P$ and $C_I$ is shown in FIG. 6. It is to be noted that the closed-loop cutoff frequencies $\omega_d$ and $\omega_q$ may also be selected to be functions of the velocity of the motor 20. The open loop transfer matrix becomes:

$$L = \begin{bmatrix} \dfrac{\omega_d}{s} & 0 \\ 0 & \dfrac{\omega_q}{s} \end{bmatrix} \quad \text{(Equation 27)}$$

In some embodiments, the compensation modules 306 and 310 are configured to cause the closed-loop system to produce a frequency response of a second order. Specifically, the compensation modules 306 and 310 may be configured to implement an active damping decoupling control (ADDC) configuration. In such configuration, the elements in the matrices $C_P$ and $C_I$ are selected to avoid pole-zero cancellation in the open loop transfer matrix, resulting in a second order closed-loop transfer matrix, with the capability of actively controlling the damping in the motor 20. To have a frequency response of a second order, all elements in the matrix $C_P$ for the proportional compensation module 306 are set to zero. In addition, the off-diagonal elements of the matrix $C_I$ for the integral compensation module 310 are set to zero. The resulting forward path compensation module (i.e., the compensation module 310) implements $C_I$ as:

$$C_I = \begin{bmatrix} \dfrac{K_{Idd}}{s} & 0 \\ 0 & \dfrac{K_{Iqq}}{s} \end{bmatrix} \quad \text{(Equation 28)}$$

Figure 7:
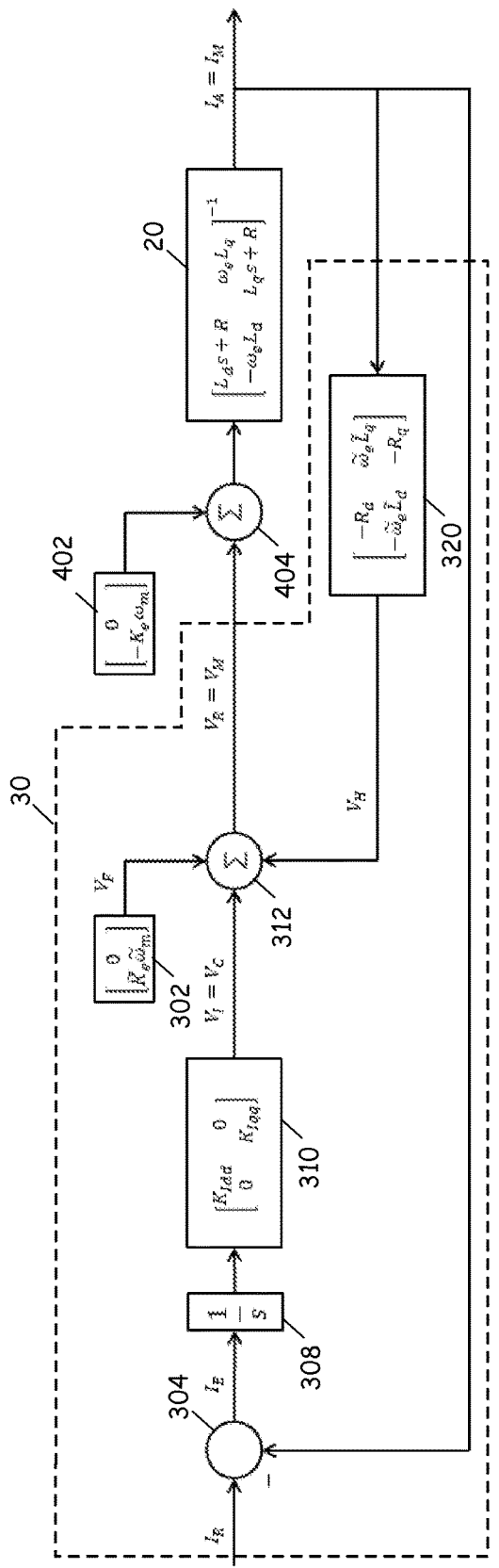
FIG. 7 is an exemplary block diagram of the control module in accordance with exemplary embodiments.

The overall block diagram for the ADDC configuration is shown in FIG. 7. In the ADDC configuration, with accurate parameter estimation, the open loop transfer matrix is shown in the following equation 29:

$$L = \begin{bmatrix} \dfrac{K_{Idd}}{s(L_d s + R + R_d)} & 0 \\ 0 & \dfrac{K_{Iqq}}{s(L_q s + R + R_q)} \end{bmatrix} \quad \text{(Equation 29)}$$

Then, the closed-loop transfer matrix can be written as:

$$T = \begin{bmatrix} \dfrac{K_{Idd}}{L_d s^2 + (R + R_d)s + K_{Idd}} & 0 \\ 0 & \dfrac{K_{Iqq}}{L_q s^2 + (R + R_q)s + K_{Iqq}} \end{bmatrix} \quad \text{(Equation 30)}$$

From the transfer matrix T, it can be seen that in this configuration, both of the closed-loop transfer functions are of second order. As can be appreciated, the damping of a second order system can be controlled independently of its natural frequency (and thus, its bandwidth). In order to achieve natural frequencies of $\omega_d$, $\omega_q$ and damping ratios of $\zeta_d$, $\zeta_q$ in the d-axis and q-axis control loops respectively, the tunable parameters may be selected as:

$$K_{Hdd} = -R_d = -2\omega_d \zeta_d \tilde{L}_d + \tilde{R} \quad \text{(Equation 31)}$$

$$K_{Hqq} = -R_q = -2\omega_q \zeta_q \tilde{L}_q + \tilde{R} \quad \text{(Equation 32)}$$

$$K_{Idd} = \omega_d^2 \tilde{L}_d \quad \text{(Equation 33)}$$

$$K_{Iqq} = \omega_q^2 \tilde{L}_q \quad \text{(Equation 34)}$$

Figure 8:
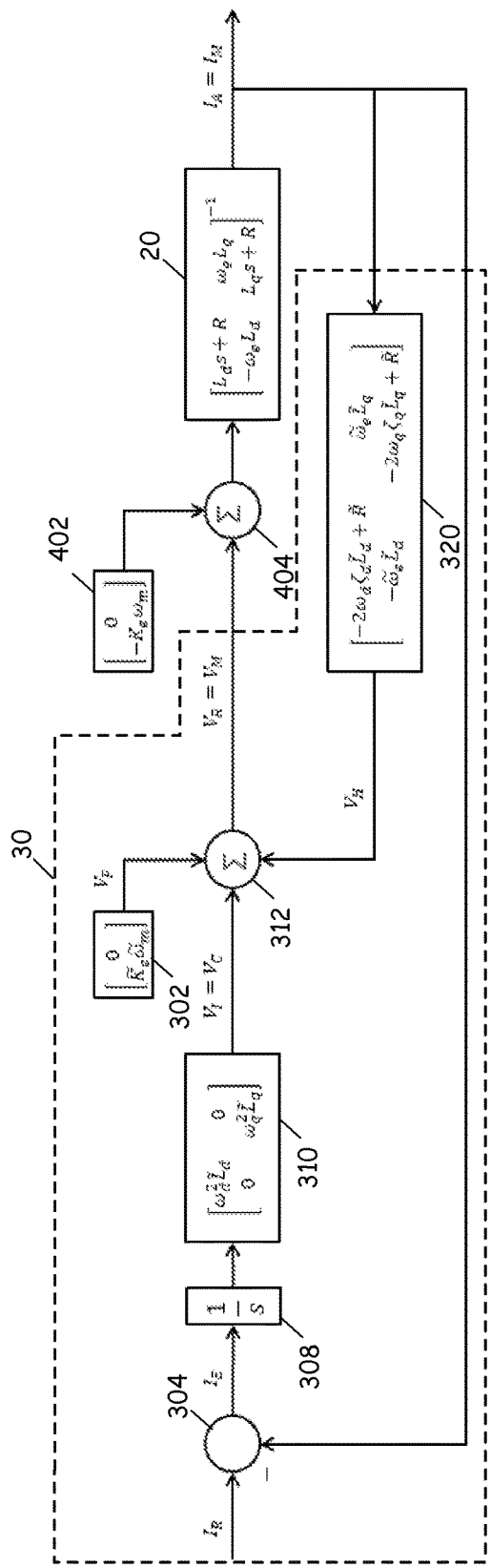
FIG. 8 is an exemplary block diagram of the control module in accordance with exemplary embodiments.

The overall block diagram for the ADDC configuration with the above forward path controller gains is shown in FIG. 8.

As one skilled in the art of second order transfer functions would recognize, as the damping ratio changes from zero to unity to greater than unity, the behavior of the system (e.g., the motor 20) changes from underdamped to critically damped and to overdamped, respectively. It should be noted that an overdamped second order system may be tuned to behave as a first order system within the desired system bandwidth without the need to perform pole-zero cancellations. In order to do so, the pole locations of the system should be considered. In order to mimic a first order behavior with a certain desired bandwidth, it is to be ensured that the faster pole is sufficiently far away from the slower pole, while the slower pole location corresponds to the desired closed-loop cutoff frequency for an effective first order system. Thus, a sufficiently high damping ratio is selected first, and the corresponding value of the natural frequency is obtained by placing the slower pole at the desired closed-loop bandwidth. Consequently, the faster pole moves far away enough from the slower pole, and the closed-loop transfer function behaves effectively as a first order system dominated by the slower pole. In such a way, the configuration shown in FIG. 8 causes the closed-loop system to behave like a first order system.

The ADDC configuration shown in FIG. 8 allows for tuning the motor control loop (i.e., the compensation module 310) to achieve different design goals in terms of transfer function behavior in both the d-axis and the q-axis control loops. Further, it is observed that when tuned as an overdamped system so as to mimic a first order system behavior with a certain bandwidth, the ADDC configuration is insensitive to both motor input disturbances as well as to imperfect decoupling.

Figure 9:
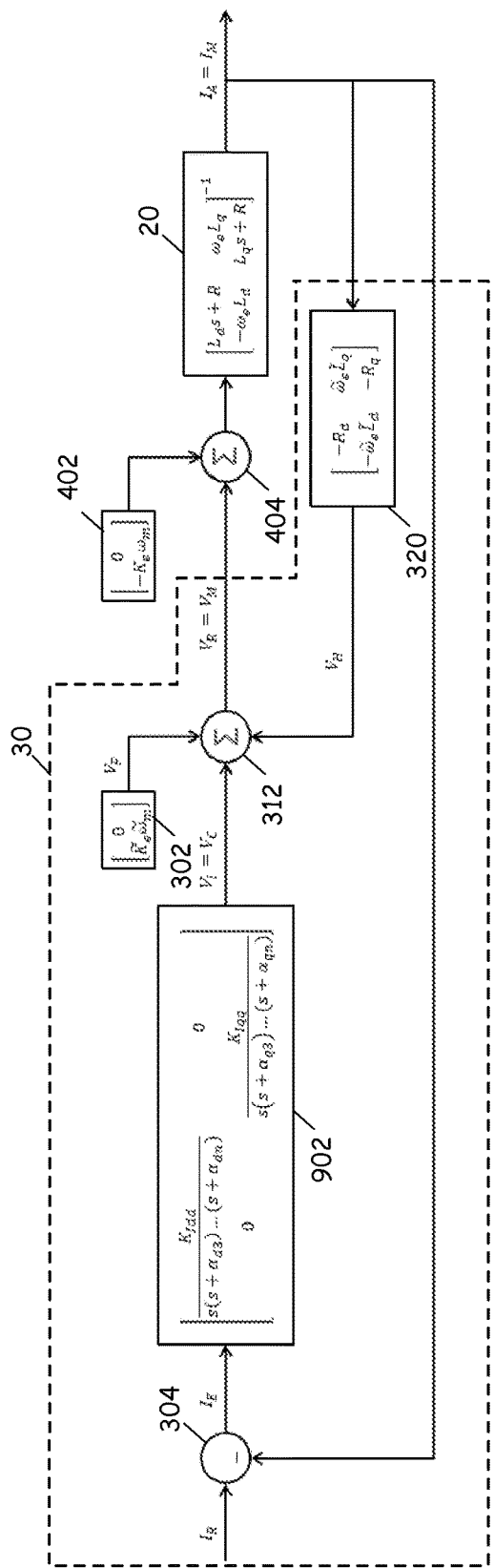
FIG. 9 is an exemplary block diagram of the control module in accordance with exemplary embodiments.

In some embodiments, the compensation modules 306 and 310 can be configured to implement a third or higher order transfer function responses of the motor 20 as shown in FIG. 9. In order to obtain a closed-loop transfer function $n^{th}$ order (n being greater than or equal to three) in both of the d-axis and the q-axis control loops, the compensation modules 306 and 310 may be replaced by a single compensation module 902 containing a compensation matrix C(s), which may be selected as:

$$C(s) = \begin{bmatrix} \dfrac{K_{Idd}}{s(s+\alpha_{d3})\ldots(s+\alpha_{dn})} & 0 \\ 0 & \dfrac{K_{Iqq}}{s(s+\alpha_{q3})\ldots(s+\alpha_{qn})} \end{bmatrix} \quad \text{(Equation 35)}$$

It is to be noted that with this selection of the elements for the matrix C(s), each of the d-axis and q-axis loops have n ($K_{Idd}$, $R_d$, $\alpha_{d3}$, ..., $\alpha_{dn}$ in the d-axis loop and $K_{Iqq}$, $R_q$, $\alpha_{q3}$, ..., $\alpha_{qn}$ in the q-axis loop) unknowns, where n is an integer greater than or equal to three. With the assumption of accurate parameter estimation, the open loop transfer function can be written as:

$$L = \begin{bmatrix} \dfrac{K_{Idd}}{s(s+\alpha_{d3})\ldots(s+\alpha_{dn})(L_d s + R + R_d)} & 0 \\ 0 & \dfrac{K_{Iqq}}{s(s+\alpha_{q3})\ldots(s+\alpha_{qn})(L_q s + R + R_q)} \end{bmatrix} \quad \text{(Equation 36)}$$

Thus, the closed-loop transfer matrix becomes:

$$T = \begin{bmatrix} \dfrac{K_{Idd}}{s(s+\alpha_{d3})\ldots(s+\alpha_{dn})(L_d s + R + R_d) + K_{Idd}} & 0 \\ 0 & \dfrac{K_{Iqq}}{s(s+\alpha_{q3})\ldots(s+\alpha_{qn})(L_q s + R + R_q) + K_{Iqq}} \end{bmatrix} \quad \text{(Equation 36)}$$

Figure 10:
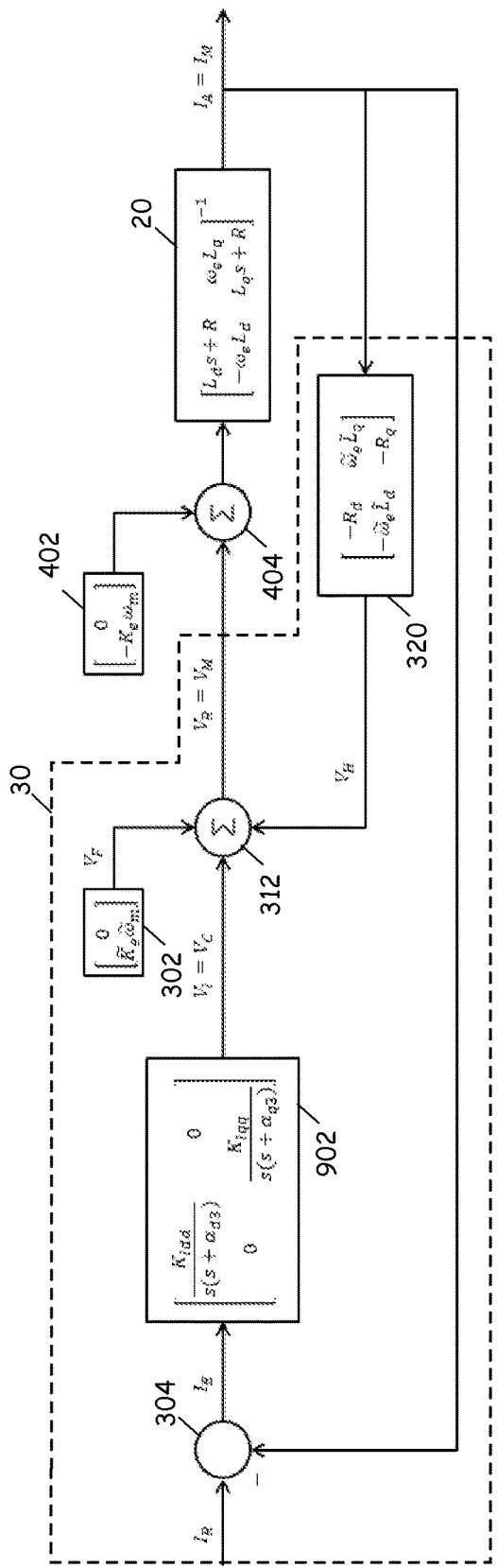
FIG. 10 is an exemplary block diagram of the control module in accordance with exemplary embodiments.

In some embodiments, in order to cause the closed-loop system to mimic a third or higher order system of a specific type, a closed-loop transfer matrix of the form below may be obtained:

$$T = \begin{bmatrix} \dfrac{\omega_d^n}{(s+\omega_d)^n} & 0 \\ 0 & \dfrac{\omega_q^n}{(s+\omega_q)^n} \end{bmatrix} \quad \text{(Equation 38)}$$

where $\omega_d$ and $\omega_q$ are d-axis and q-axis closed-loop bandwidths, respectively. A third or higher order system can, in general, have n different pole locations. In some embodiments, the pole locations may be set to n different places. This closed-loop transfer matrix is obtained by comparing the characteristic polynomials (i.e., denominators of transfer functions) from equations 37 and 38 for T in both of the d-axis and the q-axis loops and solving for the 2n unknowns in terms of R, $L_d$, $L_q$, $R_d$, $R_q$, $\omega_d$, and $\omega_q$. For example, a third order closed-loop transfer function requirement in each of the d-axis loop and the q-axis loop is considered. The block diagram for this case is shown in FIG. 10. It is to be noted that equation 38 is just an example showing all poles are placed in the same location.

Comparing the characteristic polynomials in equations 36 and 37 for a third order transfer function for the d-axis loop results in the following:

$$\dfrac{K_{Idd}}{L} = \omega_d^3 \quad \text{(Equation 39)}$$

$$\alpha_{d3} + \dfrac{R + R_d}{L} = 3\omega_d \quad \text{(Equation 40)}$$

$$\alpha_{d3}\left(\dfrac{R + R_d}{L}\right) = 3\omega_d^2 \quad \text{(Equation 41)}$$

Equations 39-41 can be solved for $K_{Idd}$, $\alpha_{d3}$ and $R_d$ in terms of R, L and $\omega_d$ in order to obtain the desired closed-loop polynomial.

Figure 11:
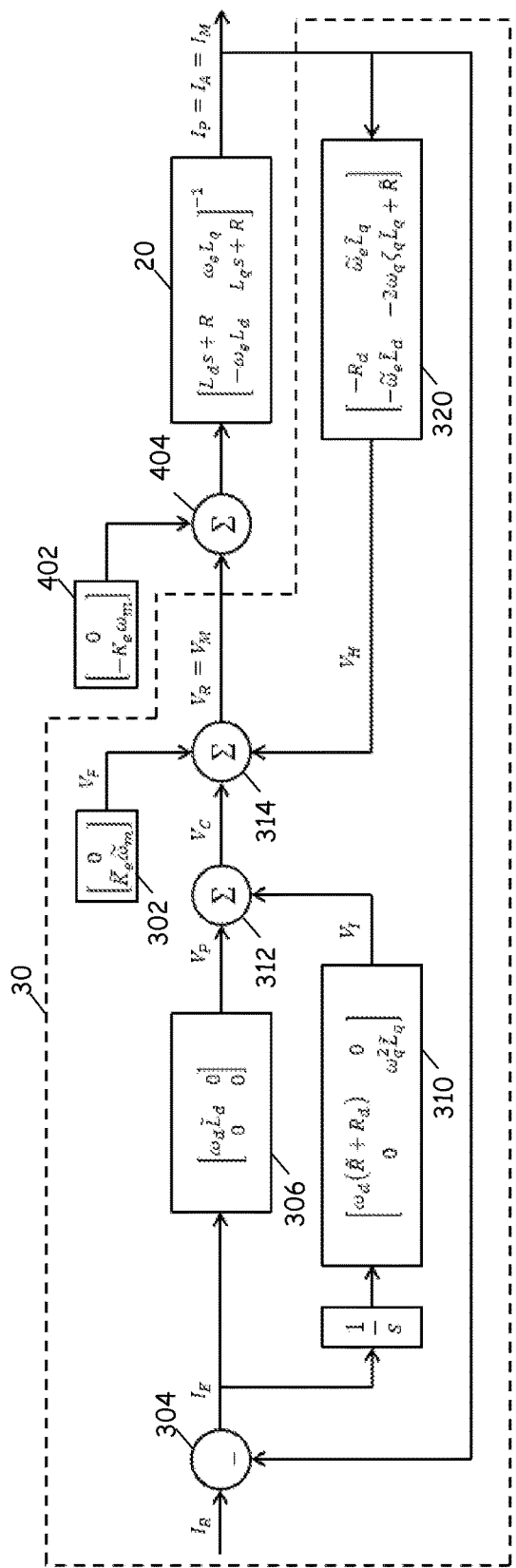
FIG. 11 is an exemplary block diagram of the control module in accordance with exemplary embodiments.

In some embodiments, the compensation modules 306 and 310 may be configured in such a way that the d-axis control loop and the q-axis control loop have different closed-loop transfer function orders. FIG. 11 illustrates an example of control loops that have different orders. Specifically, matrices shown in the modules 306 and 310 show that the d-axis loop has a first order and the q-axis has a second order. As can be recognized, many other combinations of different orders for the d-axis and q-axis control loops are possible.

Figure 12:
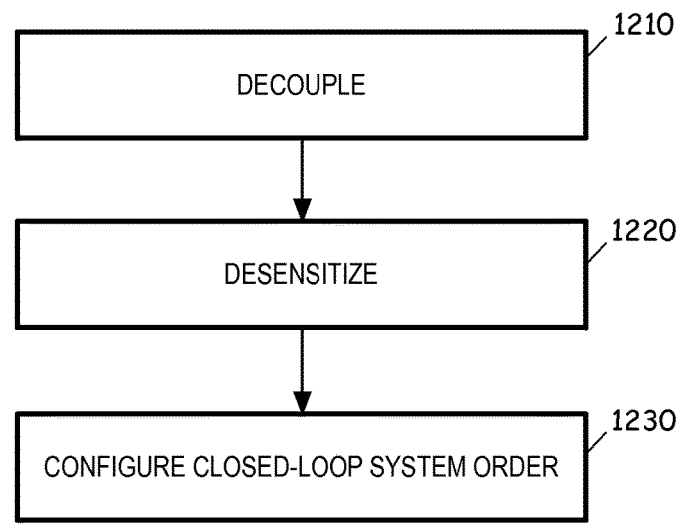
FIG. 12 is flow diagram illustrating a control method for controlling an electric motor in accordance with exemplary embodiments.

FIG. 12 is a flow diagram for a control method that can be performed by the control module 30 in accordance with some embodiments of the invention. As can be appreciated in light of the disclosure, the order of operation within the method is not limited to the sequential execution as illustrated in FIG. 12, but may be performed in one or more varying orders as applicable and in accordance with the present disclosure.

At block 1210, the control module 30 decouples the d-axis component of the output current from the influence of the q-axis component of the output current and decouples the q-axis component of the output current from the influence of the d-axis component of the output current. In some embodiments, the control module 30 achieves such decoupling of current components by applying the voltage commands generated based on the matrices $C_P$, $C_I$ and H as described above.

At block 1220, the control module 30 desensitizes the operation of the motor 20 from the variations of a set of operating parameters of the motor 20. More specifically, the control module 30 determines a first set of gain factors to generate a first voltage command based on the feedback current received from the motor 20, in order to cause the motor 20 to generate the output current with reduced influence of variations of a set of operating parameters of the motor. In some cases, the variations of the set of operating parameters are due to inaccurate estimation of the operating parameters. In some embodiments, the set of operating parameters includes the resistance of the motor 20. The control module 30 also causes a reduction in the response time for the motor 20 to respond to the input voltage command as the control module 30 desensitizes the motor operation. In some embodiments, the control module 30 determines the first set of gain factors in order to tune a damping ratio and natural frequency of the closed-loop system. In these embodiments, at least one of the first set of gain factors is a function of natural frequency of the closed-loop system.

At block 1230, the control module 30 determines a second set of gain factors to generate the second voltage command based on a difference between the feedback and a desired current, in order to cause the closed-loop system to generate the output current as a first, second or higher order response. The output current includes a d-axis component and a q-axis component. The control module 30 is configured to determine the second set of gain factors such that the input voltage command causes the motor to generate the d-axis component of the output current and the q-axis component of the output current as different order responses. At least one of the second set of gain factors is a function of resistance of the motor. At least one of the second set of gain factors is a function of inductance of the motor. At least one of the second set of gain factors is set to zero. The first and second voltage commands are combined into the input voltage command supplied to the motor 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system for controlling an electric motor that generates an output current from an input voltage command, the system comprising:
a first module configured to:
receive the output current from the electric motor as a feedback, the output current including a direct axis (d-axis) component and a quadrature axis (q-axis) component;
generate a first voltage command based on an artificial resistance value ($R_d$, and $R_q$) and the feedback by using a transfer matrix $$H = \begin{bmatrix} -R_d & \hat{\omega}_e \hat{L}_q \\ -\hat{\omega}_e \hat{L}_d & -R_q \end{bmatrix},$$

a q-axis component of the first voltage command being decoupled from effect of the d-axis component of the output current based on an estimated inductance value ($\hat{L}_d$ and $\hat{L}_q$) and motor velocity ($\hat{\omega}_e$), and a d-axis component of the first voltage command being decoupled from effect of the q-axis component of the output current based on the estimated inductance value, and a current drawn by the electric motor being desensitized from variations of motor operation parameters based on negative values of the artificial resistance value ($R_d$, and $R_q$);
a second module configured to:
receive a difference between the feedback and a commanded current; and
generate a second voltage command based on an estimated inductance value of the electric motor and a frequency response characteristic of the system, which is a closed-loop system; and
an addition module configured to generate the input voltage command for the electric motor by adding the first voltage command and the second voltage command, the input voltage command being applied to the electric motor to generate corresponding amount of torque.

2. The system of claim 1, wherein the first module is further configured to compute the artificial resistance value based on operating parameters of the electric motor.

3. The system of claim 1, wherein the first module is further configured to reduce a time for the motor to respond to the input current command.

4. The system of claim 2, wherein the closed-loop system includes the electric motor, the first module, and the second module.

5. A method of controlling an electric motor of a system, wherein the electric motor generates an output current from an input voltage command, the method comprising:
receiving the output current from the electric motor as a feedback;
generating a first voltage command based on an artificial resistance value ($R_d$, and $R_q$) and the feedback by using a transfer matrix that includes the artificial resistance value ($R_d$, and $R_q$) in off-diagonal elements for desensitizing a current drawn by the electric motor from variations of motor operation parameters based on negative values of the artificial resistance value;

determining a difference between the feedback and a desired current;

generating a second voltage command based on an estimated inductance value of the electric motor and a frequency response characteristic of the system, which is a closed-loop system;

generating the input voltage command for the electric motor by adding the first voltage command and the second voltage command; and applying the input voltage command to the electric motor to generate corresponding amount of torque.

6. The method of claim 5, wherein both, the output current and the first voltage command, include a direct axis (d-axis) component and a quadrature axis (q-axis) component, and wherein the method further comprises:

configuring diagonal elements of the transfer matrix using an estimated inductance value ($\hat{L}_d$ and $\hat{L}_q$) and motor velocity ($\omega_e$) for:

generating the q-axis component of the first voltage command such that a response of the d-axis component of the output current is decoupled from effect of the q-axis component of the output current; and generating the d-axis component of the first voltage command such that a response of the q-axis component of the output current is decoupled from effect of the d-axis component of the output current.

7. The method of claim 5, wherein the artificial resistance is computed based on a set of operating parameters of the motor.

8. The method of claim 5, wherein the method further comprises reducing a time for the motor to respond to the input current command.

9. The method of claim 7, wherein the closed-loop system includes the electric motor, a first module that generates the first voltage command, and a second module that generates the second voltage command.

10. The system of claim 1, wherein the artificial resistance value comprises a direct axis component ($R_d$) and a quadrature axis component ($R_q$).

11. The system of claim 1, wherein, in response to the system being a first order closed-loop system, the second module is configured to:

generate a first voltage sub-command based on the estimated inductance value;

generate a second voltage sub-command based on said artificial resistance value; and generate the second voltage command by adding the first voltage sub-command and the second voltage sub-command.

12. The system of claim 11, wherein the second module is further configured to generate the second voltage sub-command based on a desired frequency response.

13. The system of claim 1, wherein the second voltage command comprises a direct axis component and a quadrature axis component, and wherein, based on the decoupling by the first module, the second module is configured to generate the q-axis component of the second voltage command that is decoupled from effect of the d-axis component of the output current, and to generate the d-axis component of the second voltage command that is decoupled from effect of the q-axis component of the output current.

14. The method of claim 6, wherein the artificial resistance value comprises a direct axis component ($R_d$) and a quadrature axis component ($R_q$).

15. The method of claim 5, wherein, in response to the system being a first order closed-loop system, the method further comprises:

generating a first voltage sub-command based on the estimated inductance value;

generating a second voltage sub-command based on said artificial resistance value; and generating the second voltage command by adding the first voltage sub-command and the second voltage sub-command.

16. The method of claim 15, wherein generating the second voltage sub-command is further based on a cutoff frequency of the first order closed-loop system.

17. The method of claim 6, wherein the second voltage command comprises a direct axis component and a quadrature axis component, and wherein, based on the decoupling of the direct axis component of the output current and the quadrature axis component of the output current, the method further comprises:

generating the q-axis component of the second voltage command that is decoupled from effect of the d-axis component of the output current; and generating the d-axis component of the second voltage command that is decoupled from effect of the q-axis component of the output current.

* * * * *